(12) United States Patent
Taruta et al.

(10) Patent No.: US 7,863,790 B2
(45) Date of Patent: Jan. 4, 2011

(54) MOTOR

(75) Inventors: Akira Taruta, Nagano (JP); Toshio Ueno, Nagano (JP)

(73) Assignee: Nidec Sankyo Corporation (JP)

( * ) Notice: Subject to any disclaimer, the term of this patent is extended or adjusted under 35 U.S.C. 154(b) by 318 days.

(21) Appl. No.: 12/111,366

(22) Filed: Apr. 29, 2008

(65) Prior Publication Data
US 2008/0290755 A1 Nov. 27, 2008

(30) Foreign Application Priority Data
May 23, 2007 (JP) ............................. 2007-137228

(51) Int. Cl.
*H02K 7/08* (2006.01)
*H02K 37/14* (2006.01)

(52) U.S. Cl. ......................... 310/90; 310/83

(58) Field of Classification Search .................. 310/90, 310/80, 83; 384/215, 223, 218, 219
See application file for complete search history.

(56) References Cited

U.S. PATENT DOCUMENTS 6,208,046 B1 * 3/2001 Lee .......................... 310/49.01
6,541,886 B2 * 4/2003 Mayumi ...................... 310/91
2006/0108885 A1 5/2006 Nishimura

FOREIGN PATENT DOCUMENTS

JP 2006-129649 A 5/2006

* cited by examiner

*Primary Examiner*—Quyen Leung
*Assistant Examiner*—David W. Scheuermann
(74) *Attorney, Agent, or Firm*—Cantor Colburn LLP (57) ABSTRACT

A motor may include an urging member which is mounted on a fixed body for urging the bearing, and a pair of engaging grooves formed on the fixed body. The urging member may includes a pair of hook parts which are bent from respective tip ends of a pair of side plate parts. When the urging member is mounted on the fixed body, a pair of the hook parts are inserted from open ends and engaged with a pair of the engaging grooves and, when an outward force is applied to the urging member, the hook parts abut with an opposite inner wall of the engaging grooves located on a tip end side in the axial line direction of the motor to prevent the hook parts from being disengaged from the engaging grooves.

15 Claims, 9 Drawing Sheets

TIP END SIDE ← → BASE END SIDE

TIP END SIDE ← → BASE END SIDE

TIP END SIDE ← → BASE END SIDE

--PRIOR ART--

Fig. 9

MOTOR

CROSS REFERENCE TO RELATED APPLICATION

The present invention claims priority under 35 U.S.C. §119 to Japanese Application No. 2007-137228 filed May 23, 2007, which is incorporated herein by reference.

FIELD OF THE INVENTION

An embodiment of the present invention may relate to a motor. More specifically, an embodiment of the present invention may relate to a fixing structure of an urging member for urging a bearing to a shaft end of a rotor shaft.

BACKGROUND OF THE INVENTION

Figure 9:
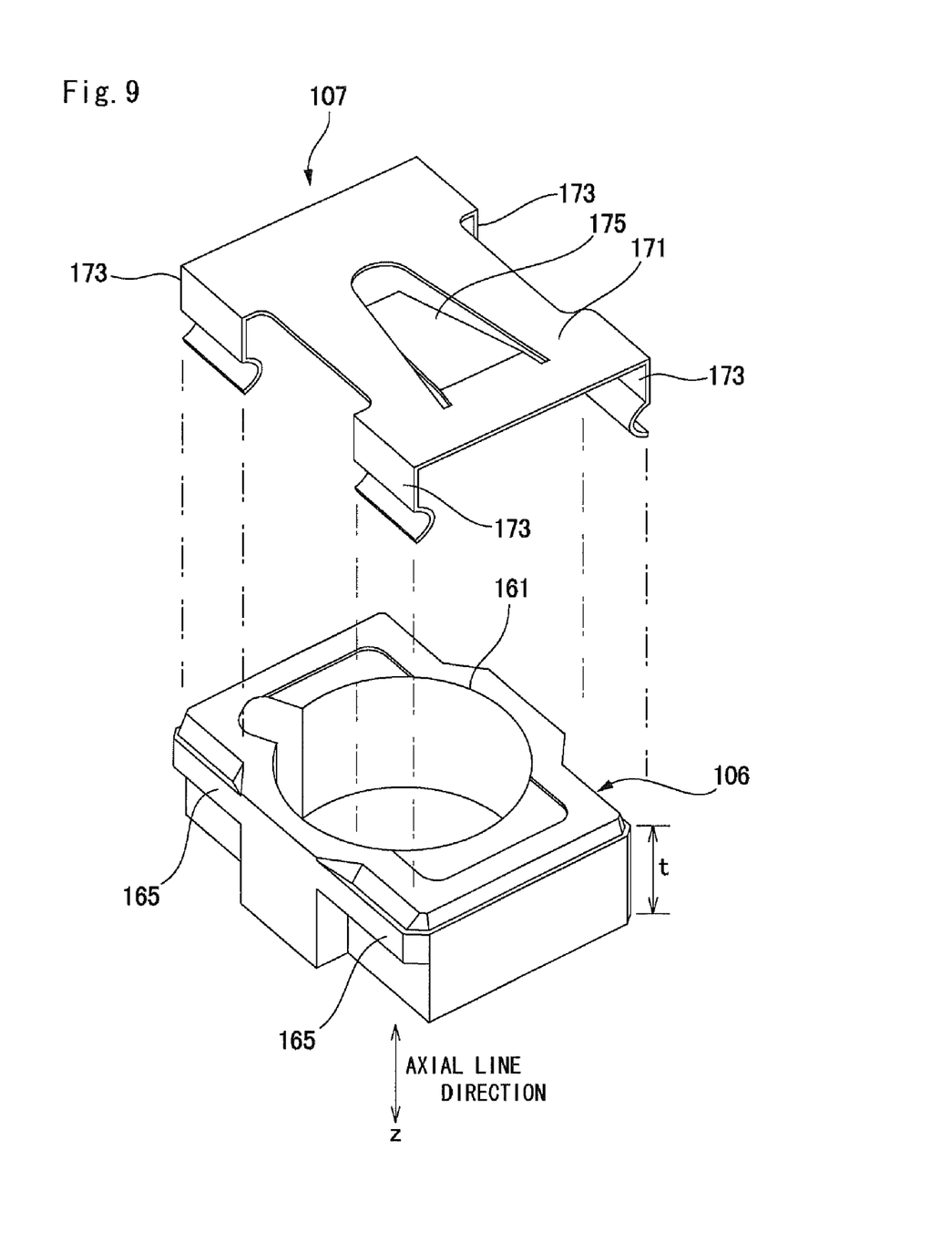
FIG. 9 is a perspective view showing a bearing holder and an urging member which are used in a conventional motor.

A stepping motor which is used in a digital camera, a digital video camera, etc., commonly includes a rotor provided with a permanent magnet on an outer periphery of a rotor shaft, a fixed body provided with a ring-shaped stator which faces an outer peripheral face of the permanent magnet through a predetermined gap space, and a bearing which supports a shaft end on a base end side of the rotor shaft. As shown in FIG. 9, a roughly rectangular bearing holder 106 which is formed with a through hole 161 into which a bearing is inserted is disposed at a position adjacent to the stator on a base end side (opposite-to-output side) of the fixed body. When the bearing is to be urged to the rotor shaft, an urging member 107 is mounted on the bearing holder 106. The urging member 107 includes, for example, a bottom face part 171 which is formed with a spring part 175 for urging the bearing and four engaging pawls 173 which are extended from the bottom face part 171. When the urging member 107 is pushed toward the bearing holder 106 in an axial line direction of the motor (direction as shown by the arrow "z"), the four engaging pawls 173 are engaged with stepped parts 165 of the bearing holder 106 and the urging member 107 is held by the bearing holder 106 (see, for example, Japanese Patent Laid-Open No. 2006-129649).

However, when the thickness "t" of the bearing holder 106 is reduced to be thinner or when a size of the entire bearing holder 106 is reduced in order to cope with a further downsizing of the stepping motor, a space for forming the stepped parts 165 cannot be secured sufficiently and thus the urging member 107 is not held securely. As a result, a positional displacement or dropping-off of the urging member 107 may easily occur. Especially, when an impact for separating the urging member 107 from the bearing holder 106 in the axial line direction of the motor is applied to the urging member 107, a positional displacement or dropping-off of the urging member 107 may easily occur. Alternatively, in order to prevent the positional displacement or the dropping-off of the urging member 107, it is conceivable to increase the number of the hook parts 173 but, when the number of the hook parts 173 is increased, downsizing of the motor becomes difficult.

SUMMARY OF THE INVENTION

In view of the problems described above, an embodiment of the present invention may advantageously provide a motor which is capable of securely attaching an urging member to a bearing holder even when a size of the motor is reduced.

Thus, according to an embodiment of the present invention, there may be provided a motor including a rotor having a permanent magnet which is fixed to an outer periphery of a rotor shaft, a fixed body having a ring-shaped stator which faces an outer peripheral face of the permanent magnet through a gap space, a bearing which supports a shaft end on a base end side of the rotor shaft, an urging member which is mounted on the fixed body on a base end side in an axial line direction of the motor for urging the bearing to a tip end side in the axial line direction of the motor, and a pair of engaging grooves which are formed on both side face parts opposite to each other of the fixed body so as to extend in a direction crossing the axial line direction of the motor at positions apart from an end face on a base end side of the fixed body with a predetermined distance in the axial line direction of the motor, and whose open ends are directed in the same direction. The urging member includes a bottom face part provided with a spring part for urging the bearing, a pair of side plate parts which are bent from respective opposite edge parts of the bottom face part, and a pair of hook parts which are bent from respective tip ends of a pair of the side plate parts. When the urging member is to be mounted on the fixed body, the urging member is slid in the direction crossing the axial line direction of the motor so that the bottom face part of the urging member is superposed on the end face on the base end side of the fixed body and a pair of the hook parts are inserted from the open ends into a pair of the engaging grooves to be engaged with a pair of the engaging grooves.

In accordance with the embodiment described above, when the urging member is to be mounted on the fixed body, the urging member is slid in the direction crossing the axial line direction of the motor so that the bottom face part of the urging member is superposed on the end face on the base end side of the fixed body and a pair of the hook parts are inserted from the open ends into a pair of the engaging grooves to be engaged with a pair of the engaging grooves. Therefore, different from a conventional case that an urging member is pressed against the fixed body in the axial line direction of the motor and engaged with the fixed body, the urging member can be firmly held by the fixed body even when there is a large restriction in a structure for the engaging part of the urging member in order to attain reduction of the size of the motor. Accordingly, in the state that the urging member has been mounted on the fixed member, even when an outside force in the axial line direction of the motor for causing the urging member to be separated from the fixed body is applied to the urging member, positional displacement or falling-off of the urging member does not occur.

Further, the motor in accordance with the embodiment described above is structured so that, when the outside force in the axial line direction of the motor which is to be made the urging member separate from the fixed body is applied to the urging member in a state that the urging member has been mounted on the fixed body, the hook parts abut with an inner wall of the engaging grooves which is located on the tip end side in the axial line direction of the motor to prevent the hook parts from being disengaged from the engaging grooves. According to the embodiment described above, the engaging grooves, i.e., the recessed parts having a narrow width are utilized to engage with the hook parts. Therefore, in the state that the urging member has been mounted on the fixed body, even when an outside force in the axial line direction of the motor is applied to the urging member so as to separate from the fixed body, the hook parts do not disengage from the engaging grooves.

In accordance with an embodiment, the fixed body includes a bearing holder which is adjacently disposed on a base end side of the stator in the axial line direction of the motor, and the bearing holder is formed with a through hole into which the bearing is movably inserted in the axial line direction of the motor. Further, a pair of the engaging grooves are formed with an end face on the base end side of the stator and a pair of stepped parts formed on an inner end face of the bearing holder that is superposed on the end face on the base end side of the stator. According to this structure, the engaging grooves can be formed in a simple structure. Further, in order to shorten a dimension in the axial direction of the motor, even when a width of the bearing holder is reduced, the urging member can be firmly held by the fixed body. Therefore, in the state that the urging member has been mounted on the fixed body, even when an outside force in the axial line direction of the motor is applied to the urging member so as to separate from the fixed body, positional displacement or falling-off of the urging member does not occur.

In accordance with an embodiment, a protruded part for coming-off prevention of the urging member is continuously formed in one of the hook part and the engaging groove, and a recessed part is continuously formed in the other of the hook part and the engaging groove so as to be fitted to the protruded part for relatively locking the protruded part. As described above, when a protruded part for coming-off prevention of the urging member is formed in one of the hook part and the engaging groove, and a recessed part is formed in the other, the coming-off or dropping-off of the urging member can be prevented by using the hook part and thus its structure for the coming-off prevention is simple. Specifically, it may be structured that the protruded part for coming-off prevention is continuously formed in the hook part, and the recessed part which locks the protruded part is continuously formed in the engaging groove.

In accordance with an embodiment, the protruded part for coming-off prevention is continuously formed at a rear position in a slide direction of the hook part, and the recessed part is continuously formed in the stepped part on the inner end face of the bearing holder at the rear position in the slide direction so that the protruded part formed in the hook part is fitted into the recessed part. In this case, it is preferable that the protruded part and the recessed part are formed in a roughly triangular shape so that a side on a front side in the slide direction is set to be at an acute angle to the slide direction. For example, it is preferable that the protruded part and the recessed part are formed in a roughly triangular shape such that the side on the front side in the slide direction is an oblique side and a side on a rear side is set to be at a right angle to the slide direction. According to this embodiment, a structure is obtained in which the protruded part is easily fitted to the recessed part but the protruded part is difficult to be come off from the recessed part.

In accordance with an embodiment, the recessed part may be formed in the hook part and the protruded part may be formed in the engaging groove. In this case, the protruded part and the recessed part are preferably formed at the front position in the slide direction. Further, it is preferable that the protruded part and the recessed part are formed in a roughly triangular shape so that a side on a rear side in the slide direction is set to be at an acute angle to the slide direction. For example, it is preferable that the protruded part and the recessed part are formed in a roughly triangular shape such that the side on the rear side in the slide direction is an oblique side and a side on the front side is set to be at a right angle to the slide direction. According to this embodiment, a structure is obtained in which the protruded part is easily fitted to the recessed part but the protruded part is difficult to be come off from the recessed part.

In accordance with an embodiment, a corner part on a front edge of the hook part in the slide direction is formed in a round shape. According to this structure, when the urging member is to be mounted on the fixed body, the hook part can be inserted into the engaging groove smoothly.

In accordance with an embodiment, the hook part is bent to an inner side from the side plate part to be set at an acute angle between the hook part and the side plate part so that the fixed body is elastically held between the bottom face part and the hook part. According to this structure, when the hook part has been engaged with the engaging groove, an elastic deformation of the hook part becomes larger. Therefore, the hook part firmly engages with the engaging groove and thus the fixed body can be securely held by the bottom face part and the hook part. Accordingly, in the state that the urging member has been mounted on the fixed body, even when an outside force in the axial line direction of the motor is applied to the urging member so as to separate from the fixed body, the urging member can be surely prevented from being dropped.

In accordance with an embodiment, the side plate parts are bent to inner sides from the bottom face part to be set at an acute angle between the side plate part and the bottom face part so that the fixed body is elastically held by the side plate parts. According to this structure, when the hook parts have been engaged with the engaging grooves, elastic deformations of the side plate parts become larger and thus the side plate parts are firmly engaged with the fixed body. Accordingly, in the state that the urging member has been mounted on the fixed body, even when an outside force in the axial line direction of the motor is applied to the urging member so as to separate from the fixed body, the urging member can be surely prevented from being dropped.

In accordance with an embodiment, the urging member is formed with a stopper part for abutting with the fixed body which is bent from the bottom face part on the rear end side in the slide direction.

In accordance with an embodiment, the spring part is cut and bent obliquely from the bottom face part so that a tip end is directed to the rear side in the slide direction, and a root portion of the spring part is located on the front side in the slide direction. According to this structure, when the urging member is slid, the spring part is prevented from being caught by the fixed body to be plastically deformed.

In accordance with an embodiment, the spring part is cut and bent obliquely from the bottom face part so that a tip end is directed to the front side in the slide direction, and a root portion of the spring part is located on the rear side in the slide direction. According to this structure, even when the size of the urging member is reduced with downsizing of the bearing holder, strength in the root portion of the spring part can be appropriately maintained. Therefore, plastic deformation of the spring part when the spring part is cut and bent from the urging member can be prevented.

In accordance with an embodiment, the spring part is cut and bent in a tongue piece shape from the bottom face part, and the end face on the base end side of the fixed body is formed with a recessed part over a region including a moving trajectory of the spring part when the urging member is slid. According to this structure, the spring part is securely prevented from being strongly abutted with the end face on the base end side of the fixed body to be deformed plastically at the time when the urging member is slid.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

A motor to which the present invention is applied will be described below with reference to the accompanying drawings.

Figure 1:
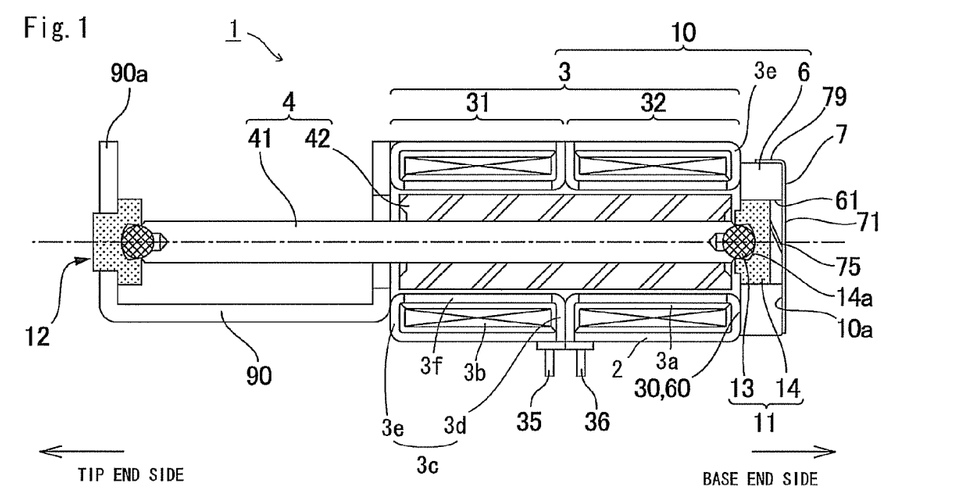
FIG. 1 is a cross-sectional view showing a motor in accordance with an embodiment of the present invention.
Figure 2A:
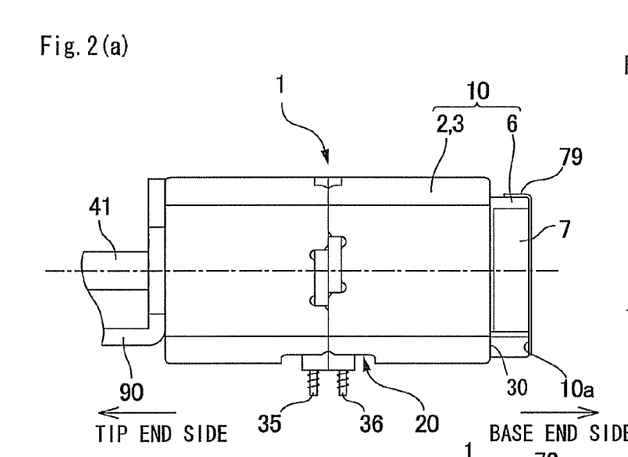
FIG. 2(a) is a front view showing a motor in accordance with an embodiment of the present invention.
Figure 2B:
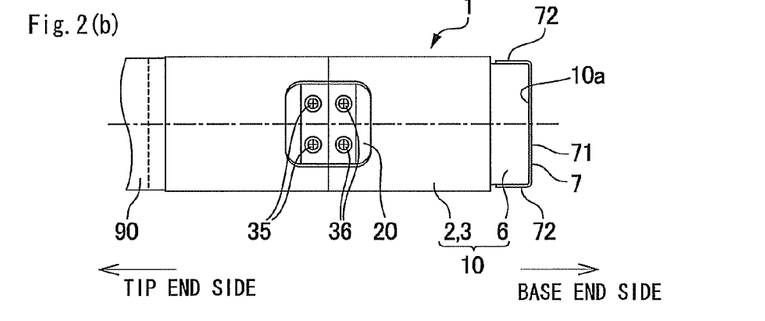
FIG. 2(b) is its bottom view.

FIG. 1 is a cross-sectional view showing a motor in accordance with an embodiment of the present invention. FIG. 2(a) is a front view showing a motor in accordance with an embodiment of the present invention, FIG. 2(b) is its bottom view, FIG. 2(c) is its right side view, and FIG. 2(d) is its right side view in a state where an urging member is not shown.

As shown in FIG. 1 and FIGS. 2(a) through 2(d), a motor 1 in this embodiment is a small stepping motor which is used in a digital camera, a digital video camera, etc. The motor 1 includes a pipe-shaped stator 3 which is structured such that stator assemblies 31 and 32, each of which is provided with a ring-shaped drive coil 3b wound around an insulator 3a and a pair of stator cores 3c that are disposed on both sides in an axial direction of the drive coil 3b, are superposed on each other in the axial direction. The stator cores 3c are comprised of an inner core 3d and an outer core 3e and, each of which is provided with a plurality of pole teeth 3f along an inner peripheral face of the drive coil 3b. The pole teeth 3f formed in each of a pair of the stator cores 3c are alternately disposed in a circumferential direction of the drive coil. Two outer cores 3e which are located on the most outer side in the axial direction include portions which are located on an outer peripheral side of the drive coils 3b for structuring a case 2. Terminal parts 35 and 36 are formed on an outer peripheral side of the stator assemblies 31 and 32, and ends of the drive coils 3b are connected to the terminal parts 35 and 36. The terminal parts 35 and 36 are protruded from an opening part 20 which is formed in the case 2.

Figure 2C:
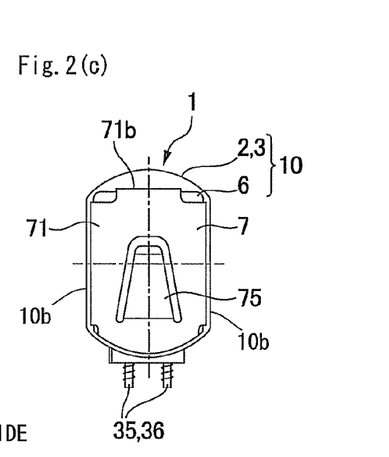
FIG. 2(c) is its right side view.
Figure 2D:
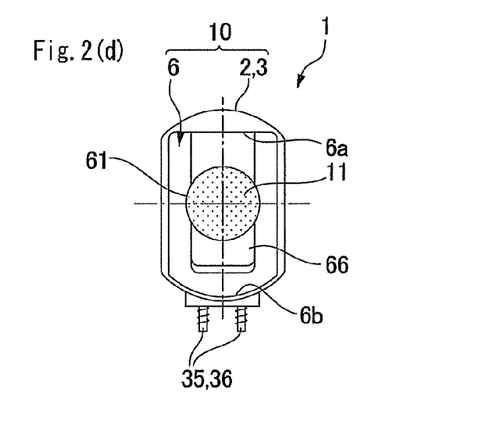
FIG. 2(d) is its right side view in a state where an urging member is not shown.

When viewed from the axial line direction of the motor as shown in FIG. 2(c), side face parts facing each other of the stator 3 are formed in a flat face and other opposite side face parts are formed in a circular arc shape. The terminal parts 35 and 36 are located on one of the circular arc portions of the stator 3.

A rotor 4 is disposed on an inner side of the pipe-shaped stator 3 and a rotor magnet 42 is mounted on an outer peripheral face on a base end side of the rotor shaft 41. "S"-poles and "N"-poles are alternately disposed on an outer peripheral face of the rotor magnet 42 in a circumferential direction. Both shaft ends of the rotor shaft 41 is rotatably held by bearings 11 and 12. The bearing 11 includes a ball 13 which is made of metal or ceramic and, a part of which is entered into a recessed part formed at a shaft end on the base end side of the rotor shaft 41, and a bearing main body 14 that is formed in a disk shape and made of resin is provided with a bottomed recessed part 14a for receiving the ball 13.

In the stator 3, roughly rectangular bearing holder 6 formed with a through hole 61 and an urging member 7 formed with a spring part 75 are disposed on a base end side (opposite-to-output side) of the rotor shaft 41 which is opposite to a tip end side (output side), in other words, on an outer side of the outer core 3e of the stator assembly 32. The bearing 11 (bearing main body 14) is inserted into the through hole 61 of the bearing holder 6 so as to be movable in an axial line direction of the motor. The spring part 75 extending within the through hole 61 abuts with a rear end face of the bearing main body 14 and the bearing 11 is urged to the rotor shaft 41.

A frame 90 having "U"-shaped cross section is fixed to an end face on the tip end side of the stator 3. The bearing 12 for supporting the shaft end on the tip end side of the rotor shaft 41 is held by an opposite plate part 90a formed in the frame 90 which faces the stator 3 with a certain distance. The bearing 12 is structured similarly to the bearing 11.

Figure 3:
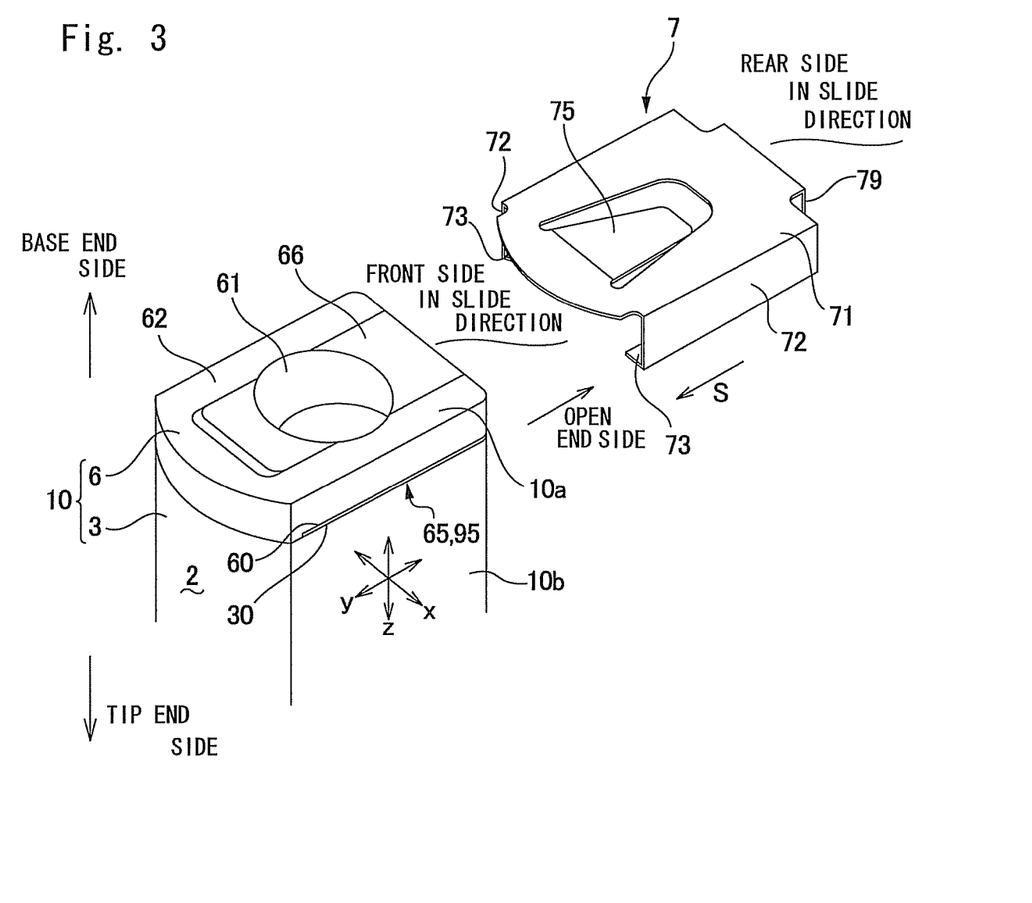
FIG. 3 is an exploded perspective view showing a mounting structure of an urging member on a fixed body in a motor in accordance with an embodiment of the present invention.

Next, referring to FIG. 3, a mounting structure of the urging member 7 in the motor 1 in accordance with this embodiment will be schematically described below. FIG. 3 is an exploded perspective view showing a mounting structure of the urging member on the fixed body in a stepping motor in accordance with this embodiment. In FIG. 3, the bearing 11 is not shown.

As described with reference to FIG. 1 and FIGS. 2(a) through 2(d), in this embodiment, the fixed body 10 is structured of the stator 3 (stator assemblies 31 and 32) which surrounds around the rotor 4 and the bearing holder 6 which is fixed by a method such as welding to the end face 30 on the base end side of the stator 3. The urging member 7 is mounted on the base end side of the fixed body 10.

In order to mount the urging member 7 on the base end side of the fixed body 10, in this embodiment, as shown in FIG. 3, the bearing holder 6 is adjacently fixed to the end face 30 on the base end side of the stator 3, i.e., to the end face of the outer core 3e of the stator assembly 32 to structure the fixed body 10. In this state, both side face parts 10b facing each other in a right and left direction ("x" direction) which is perpendicular to the axial line direction of the motor ("z" direction) are formed with a pair of engaging grooves 95 whose open ends are directed to the same direction (upper side in the "y" direction) at positions apart from the end face 10a on the base end side of the fixed body 10 to the tip end side with a predetermined distance. The engaging grooves 95 are extended in a direction crossing the axial line direction of the motor, in other words, in this embodiment, in the upper-and-lower direction ("y" direction) which is perpendicular to the axial line direction of the motor.

The urging member 7 is formed of a metal plate member which is worked in a predetermined shape so as to have a spring property. The urging member 7 includes a bottom face part 71 provided with a spring part 75 which is cut and bent obliquely in a tongue piece shape, a pair of side plate parts 72 which are bent from respective right and left edge parts opposite to each other of the bottom face part 71, and a pair of hook parts 73 which are respectively bent on an inner side from each of tip ends of a pair of the side plate parts 72. Since the urging member 7 is structured of a metal plate member so as to have a spring property, similarly to the spring part 75, a pair of the side plate parts 72, a pair of the hook parts 73 and the like are respectively provided with a spring property.

Therefore, when the urging member 7 is to be mounted on the fixed body 10 which is comprised of the stator 3 and the bearing holder 6, the urging member 7 is slid from an upper side in a direction perpendicular to the axial line direction of the motor as shown by the arrow "s". As a result, the bottom face part 71 of the urging member 7 is superposed on the end face 10a on the base end side of the fixed body 10 and a pair of the hook parts 73 is entered from the open end sides into a pair of the engaging grooves 95 and engaged with the engaging grooves 95. In this embodiment, when the urging member 7 is to be slid, the urging member 7 is arranged in which a root part of the spring part 75 is located on a front side so that the spring part 75 is not caught by the fixed body 10 when the urging member 7 is slid.

In this embodiment, a pair of the engaging grooves 95 is formed with the end face 30 on the base end side of the stator 3, i.e., the end face of the outer core 3e of the stator assembly 32, and a pair of stepped parts 65 which is formed to be recessed from the inner end face 60 of the bearing holder 6 which is superposed on the end face 30 on the base end side of the stator 3.

In order to realize a mounting structure of the urging member 7 which is described with reference to FIG. 3 in the motor 1 in accordance with this embodiment, the urging member 7 is provided with a structure which will be described below with reference to FIGS. 4(a) through 4(d).

Figure 4A:
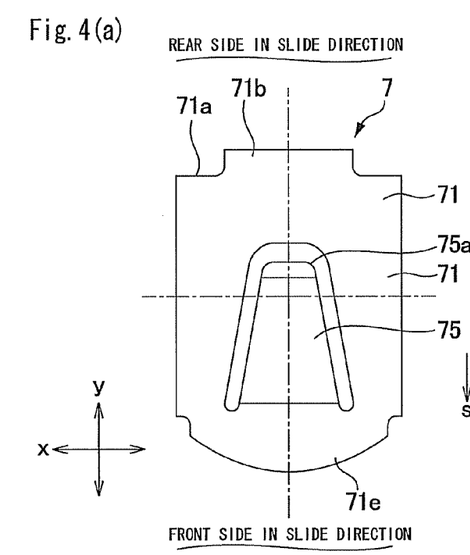
FIG. 4(a) is a plan view showing an urging member which is used in a motor in accordance with an embodiment of the present invention.
Figure 4B:
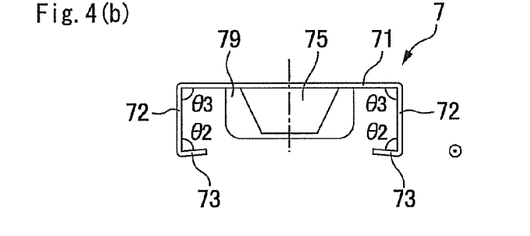
FIG. 4(b) is its front view.
Figure 4C:
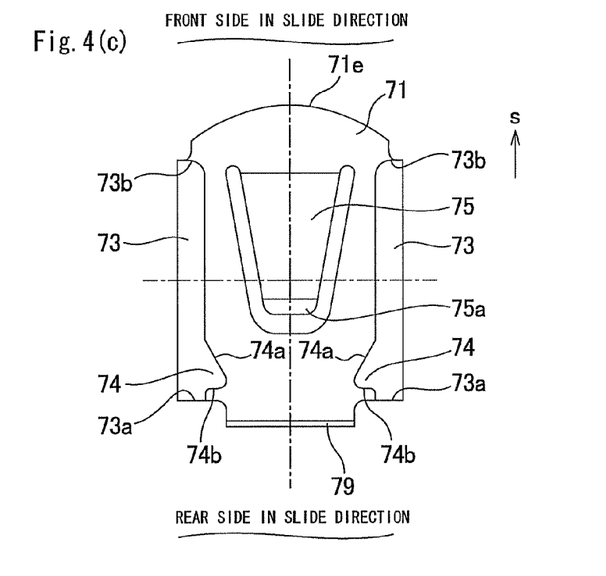
FIG. 4(c) is its bottom view.
Figure 4D:
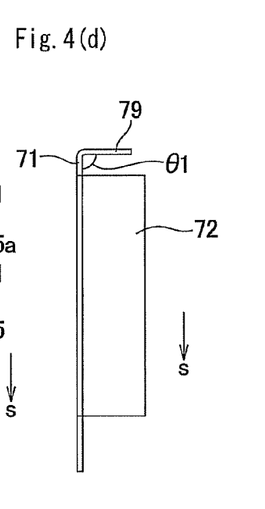
FIG. 4(d) is its right side view.

FIG. 4(a) is a plan view showing the urging member which is used in a motor in accordance with an embodiment of the present invention, FIG. 4(b) is its front view, FIG. 4(c) is its bottom view, and FIG. 4(d) is its right side view. As shown in FIGS. 4(a) through 4(d), the urging member 7 includes the bottom face part 71 which is formed in a roughly rectangular plate shape, a pair of right and left side plate parts 72 which are bent at both ends of the bottom face part 71 in the right and left direction ("x" direction) which is perpendicular to the axial line direction ("z" direction) of the motor, and a pair of the hook parts 73 which are bent to the inner side from respective end parts of a pair of the side plate parts 72.

In this embodiment, as shown in FIG. 4(b), both of the hook parts 73 are bent to a slightly larger angle than the perpendicularity to the side plate part 72 so that the angle θ2 between the side plate part 72 and the hook part 73 is set to be at an acute angle. In order to firmly hold the side face part of the bearing holder 6 by the bottom face part 71 and the hook part 73, it is preferable that the angle θ2 between the side plate part 72 and the hook part 73 is set to be at an acute angle. However, the side plate parts 72 and the hook parts 73 sandwich the bearing holder 6 from both sides and thus, when the bearing holder 6 is firmly sandwiched by both the side plate parts 72 having a spring property, the bearing holder 6 is firmly held even when the angle θ2 is set to be at a right angle or at a slightly obtuse angle. In other words, the urging member 7 can be held by the bearing holder 6 in the axial line direction of the motor ("z" direction). Further, in this embodiment, both of the side plate parts 72 are bent to a slightly larger angle than the perpendicularity to the bottom face part 71 and thus the angle θ3 between the side plate part 72 and the bottom face part 71 is set to be at an acute angle. In other words, it is structured that the bearing holder 6 is surely held by a pair of the side plate parts 72 in the right and left direction ("x" direction). However, even when a pair of the side plate parts 72 is bent at a substantially right angle with respect to the bottom face part 71, the urging member 7 is surely held by the bearing holder 6 in the right and left direction ("x" direction) by a pair of the side plate parts 72.

The bottom face part 71 is formed with the spring part 75 which is formed in a plate spring-shape by means of that its center portion is cut and bent obliquely. A tip end part 75a of the spring part 75 is slightly bent so as to be roughly parallel to the bottom face part 71.

An upper end 71a of the bottom face part 71 in the vertical direction ("y" direction) which is perpendicular to the axial line direction ("z" direction) of the motor is formed with a protruded part 71b at a center portion of the upper end 71a in its widthwise direction. The plate-shaped stopper part 79 which is bent toward the tip end side in the axial line direction of the motor is formed from the protruded part 71b so as to have a spring property. The stopper part 79 is provided so that the urging member 7 is surely held in the slide direction "s" by the bearing holder 6 when the urging member 7 is attached to the bearing holder 6. In this embodiment, the stopper part 79 is bent to a slightly larger angle than the perpendicularity to the bottom face part 71 and thus the angle θ1 between the stopper part 79 and the bottom face part 71 is set to be at an acute angle (see FIG. 4(d)). The stopper part 79 elastically sandwiches the bearing holder 6 in the slide direction "s" together with the protruded part 74 for coming-off prevention having a roughly triangular shape described below so that the urging member 7 is surely held in the slide direction "s" by the bearing holder 6. Alternatively, the stopper part 79 is capable of holding the urging member 7 in the slide direction "s" even when the stopper part 79 is bent at a substantially right angle with respect to the bottom face part 71. Further, in this embodiment, a lower end 71e of the bottom face part 71 is formed in a circular arc shape so as to correspond to the shape of the stator 3.

Both of the hook parts 73 having a spring property of the urging member 7 are, as shown in FIG. 4(c), provided with substantially same width dimension from the lower end 71e located on the front end side in the slide direction "s" to a midway position to the upper end 71a located on the rear end side in the slide direction "s". Further, roughly triangular protruded parts 74 for coming-off prevention which are respectively protruded on an inner side in the right and left direction are formed near the upper end 71*a* (rear end side position in the slide direction "s") so as to be continuously formed from the hook parts 73. The protruded part 74 is formed in a roughly triangular shape so that a side 74*a* on the front side in the slide direction "s" is set to be at an acute angle to the slide direction "s". For example, in this embodiment, the protruded part 74 is formed in a roughly triangular shape such that the side 74*a* on the front side in the slide direction "s" is an oblique side with the angle of about 30° to the slide direction "s" and a side 74*b* on the rear side is set to be at a right angle to the slide direction. In other words, the side 74*a* on the front side in the slide direction "s" of the protruded part 74 for coming-off prevention is formed as an insertion guide part for causing the protruded part 74 to be easily inserted, and the side 74*b* on the rear side of the protruded part 74 is formed as an engagement part for performing coming-off preventing operation to the bearing holder 6. Further, the protruded part 74 is continuously formed with the hook part 73 so as to protrude on the inner side from the hook part 73 and thus the protruded part 74 provides a function as the hook part 73 simultaneously. In this embodiment, a corner part 73*b* at a front edge in the slide direction "s" of the hook part 73 is formed in an "R" shape or a round shape so that the hook part 73 is easily inserted into the engaging groove 95.

Contrary to the embodiment described above, the protruded part 74 for coming-off prevention may be formed on the stepped part 65 of the bearing holder 6. In this case, the hook part 73 is formed with a recessed part having a shape corresponding to the recessed part 65*a* which is formed in the stepped part 65 of the bearing holder 6. As a result, similar operation can be attained. In this structure as described above, it is preferable that the protruded part formed in the bearing holder 6 and the recessed part formed in the hook part 73 are formed on the front end position in the slide direction.

Figures 5A, 5D:
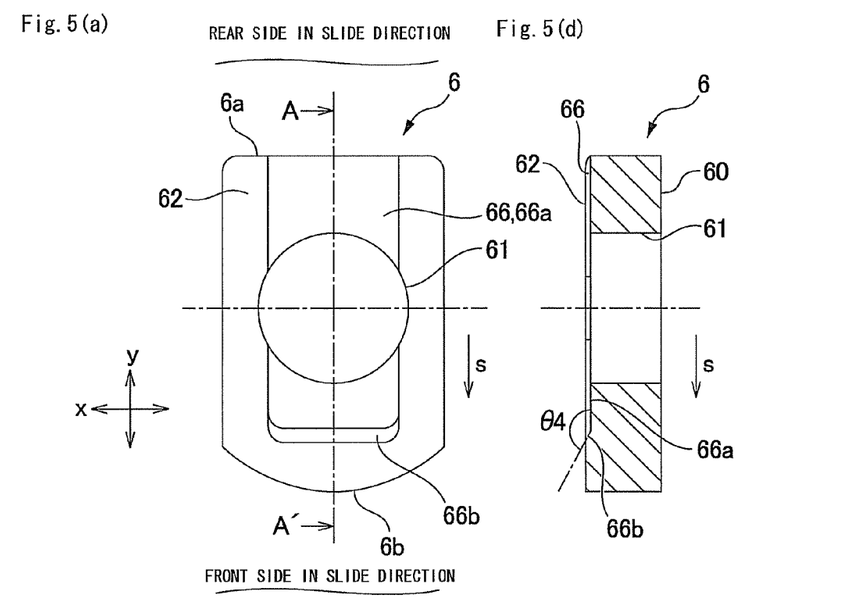
FIG. 5(a) is a plan view showing a bearing holder which is used in a motor in accordance with an embodiment of the present invention.
FIG. 5(d) is its "A-A'" cross-sectional view in FIG. 5(a).
Figure 5B:
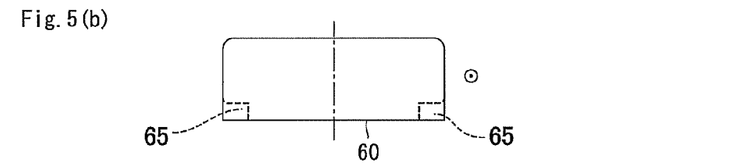
FIG. 5(b) is its front view.
Figure 5C:
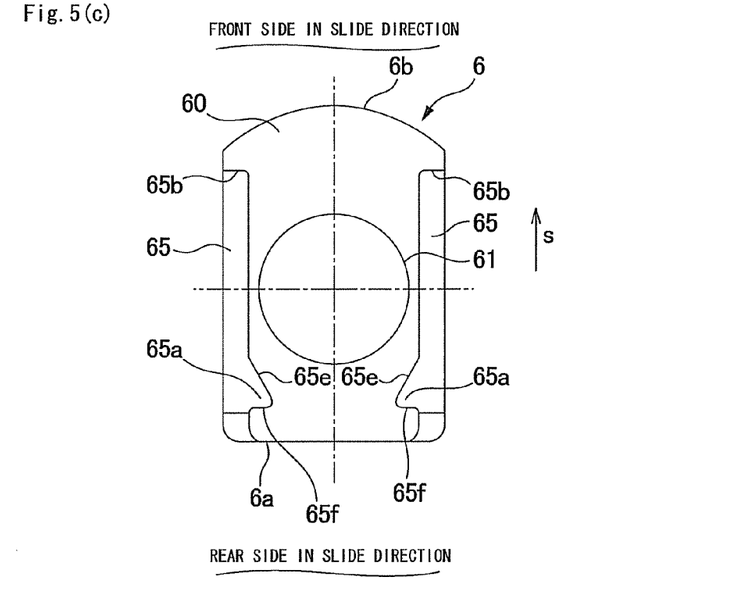
FIG. 5(c) is its bottom view.

The bearing holder 6 is provided with the following structure which will be described with reference to FIGS. 5(*a*) through 5(*d*). FIG. 5(*a*) is a plan view showing the bearing holder which is used in the motor in accordance with an embodiment of the present invention, FIG. 5(*b*) is its front view, FIG. 5(*c*) is its bottom view, and FIG. 5(*d*) is its "A-A'" cross-sectional view in FIG. 5(*a*).

In FIGS. 5(*a*) through 5(*d*), the bearing holder 6 is made of SUS (stainless steel) and formed in a roughly rectangular shape. An upper end part 6*a* located on the rear end in the slide direction "s" is formed in a straight end part and a lower end part 6*b* located on the front end in the slide direction "s" is formed in a circular arc shape corresponding to the outside shape of the stator 3. Further, working of "R"-chamfering or round-chamfering is performed at corners of the upper end part 6*a* of the bearing holder 6. A center portion of the bearing holder 6 is formed with a through hole 61 into which the bearing 11 described with reference to FIG. 1 is inserted.

In the bearing holder 6, a pair of the stepped parts 65 which are recessed along both ends in the right and left direction ("x" direction) so as to be linearly extended in the vertical direction ("y" direction) is formed on the inner end face 60 which is superposed on the end face 30 on the base end side of the stator 3 (see FIG. 3). Therefore, as shown in FIG. 3, when the bearing holder 6 is superposed on the stator 3 so that the end face 30 on the base end side of the stator 3 contacts with the inner end face 60 of the bearing holder 6, a pair of the right and left engaging grooves 95 is formed between the end face 30 of the stator 3 and the inner end face 60 of the bearing holder 6 through a pair of the right and left stepped parts 65 which is formed on the inner end face 60 of the bearing holder 6. A width of the stepped part 65 in the axial line direction of the motor ("z" direction), i.e., a width of the engaging groove 95 is set to be a little larger than a plate thickness of the hook part 73 which is inserted into the engaging groove 95 and the stepped part 65 is formed as a recessed part having a narrow width. In other words, a dimension in the "z" direction of the width of the engaging groove 95 is set to be smaller than a width dimension in the "x" direction of the hook part 73 so that the hook part 73 can be easily inserted into the engaging groove 95 but, so that disengagement of the hook part 73 is prevented by means of that an inner tip end part of the hook part 73 is abutted with the end face 30 of the stator 3 even when the inner tip end part of the hook part 73 is bent toward the end face 30 side of the stator 3 by an outside force acting on the urging member 7 in the axial line direction ("z" direction). Therefore, the hook parts 73 are prevented by the end face 30 of the stator 3 from being bent outside and thus the urging member 7 is prevented from moving outside in the axial line direction (outside in the "z" direction) to be disengaged from the bearing holder 6.

Both of the stepped parts 65 formed in the bearing holder 6 are respectively extended to a midway position on the lower side from the upper end portion. As shown in FIG. 5(*c*), both of lower end parts toward the upper side of a pair of the engaging grooves 95 are formed to be an open end so that the hook parts 73 can be inserted and their upper ends are closed by the end parts 65*b* of the stepped parts 65. Therefore, an amount of insertion of the hook part 73, i.e., an inserted position of the urging member 7 is restricted.

Further, as shown in FIG. 5(*c*), recessed parts 65*a* having a roughly triangular planar shape are formed in the stepped parts 65 near the lower end side (rear side in the slide direction "s") so that widths of a pair of the stepped parts 65 are integrally widened on the right or left side (to inner sides) so as to continue from the stepped parts 65. In this embodiment, the recessed part 65*a* is provided with a substantially same shape as the protruded part 74 for coming-off prevention which is formed in the hook part 73. In other words, the recessed part 65*a* is formed in a roughly triangular shape so that a side 65*e* on the front side in the slide direction "s" is set to be at an acute angle to the slide direction "s". For example, the recessed part 65*a* is formed in a roughly triangular shape such that the side 65*e* on the front side in the slide direction "s" is an oblique side of about 30° to the slide direction "s" and a side 65*f* on the rear side is set to be at a right angle to the slide direction. Therefore, as described with reference to FIG. 3, when the urging member 7 is slid so that the hook parts 73 of the urging member 7 are moved within the engaging grooves 95, the protruded parts 74 of the hook parts 73 are substantially fittingly engaged to the recessed parts 65*a* of the stepped parts 65 (recessed parts of the engaging grooves 95). Therefore, the side 65*f* on the rear side of the recessed part 65*a* is engaged with the side 74*b* on the rear side of the protruded part 74 to act as an engagement part for preventing coming-off of the urging member 7.

An outer end face 62 of the bearing holder 6 which is located on an opposite side to the stator 3 is formed with a shallow recessed part 66 which is extended on the front and rear side of the through hole 61 along the "y" direction over a wide range. The recessed part 66 is formed over a region including a moving trajectory of the spring part 75 when the urging member 7 is slid. Therefore, when the urging member 7 is slid, the spring part 75 does not contact with the outer end face 62 of the bearing holder 6 with a strong force. In accordance with this embodiment, a lower end of the recessed part 66 is formed in a chamfered shape and thus the angle θ4 between the bottom part 66a of the recessed part 66 and its inner wall 66b is set to be at an obtuse angle (see FIG. 5(d)).

Figure 6A:
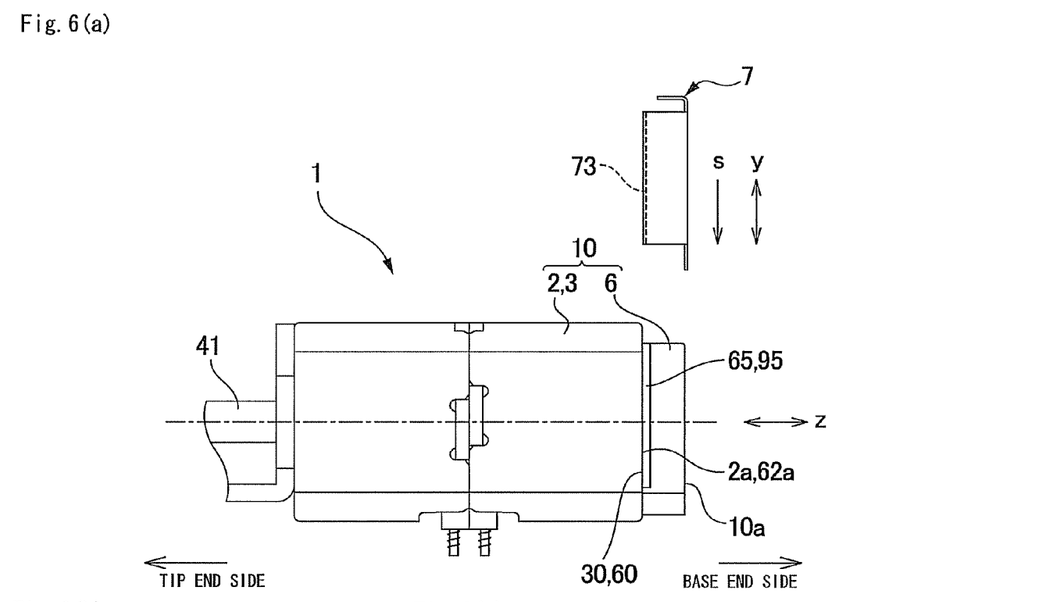
FIG. 6(a) is an explanatory view showing a state where a bearing holder is fixed to a stator in manufacturing steps for a motor in accordance with an embodiment of the present invention.
Figure 6B:
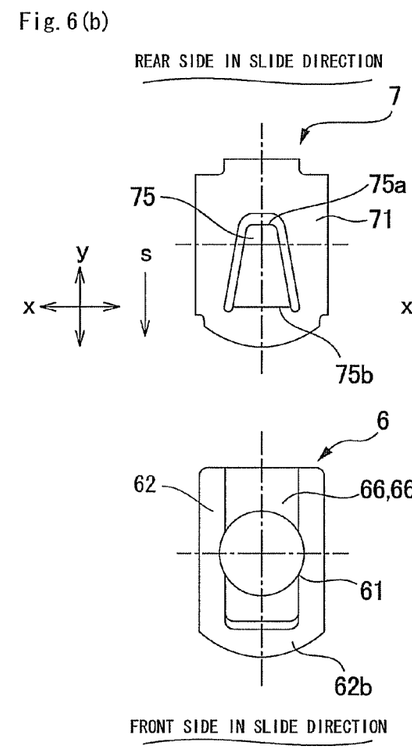
FIG. 6(b) is an explanatory view showing a positional relationship between the bearing holder and an urging member when viewed from the urging member side.
Figure 6C:
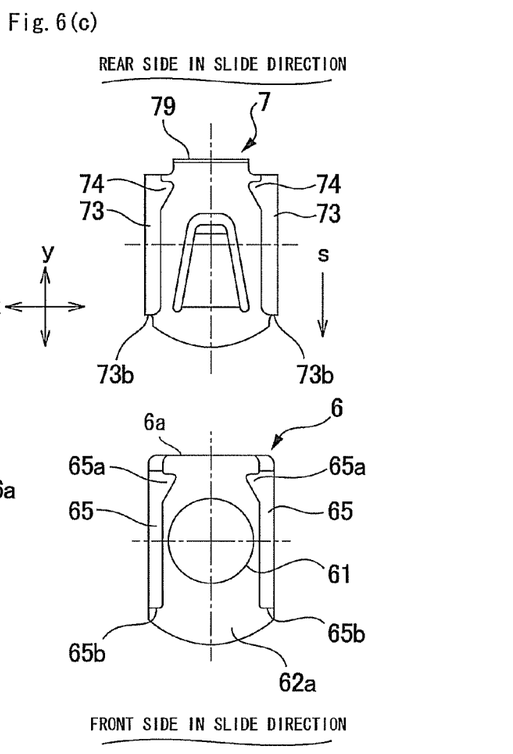
FIG. 6(c) is an explanatory view showing a positional relationship between the bearing holder and the urging member when viewed from the bearing holder side.

FIG. 6(a) is a side view showing a state where the bearing holder 6 has been fixed to the stator 3 in manufacturing steps for the motor 1. FIG. 6(b) is an explanatory view showing a positional relationship between the bearing holder 6 and the urging member 7 when viewed from the urging member 7 side. FIG. 6(c) is an explanatory view showing a positional relationship between the bearing holder 6 and the urging member 7 when viewed from the bearing holder 6 side. In FIGS. 6(b) and 6(c), the bearing 11, the stator 3 and the like are not shown.

In order to manufacture the motor 1 in this embodiment, the stator 3 and the rotor 4 are assembled and then the frame 90 is fixed to the stator 3. After that, the rotor 4 is inserted into the inside of the stator 3 and, in the state where a shaft end on the tip end side of the rotor shaft 41 is supported by the bearing 11, as shown in FIG. 6(a), the bearing holder 6 is superposed on and fixed to the end face 30 on the base end side of the stator 3. As a result, the engaging grooves 95 are formed between the stator 3 and the bearing holder 6 through the stepped parts 65 which are formed in the inner end face 60 of the bearing holder 6. Spot welding, for example, may be utilized for the fixing of the bearing holder 6 to the stator 3. In this case, a projection for spot welding may be, for example, formed at three or four positions around the through hole 61 on the inner end face 60 of the bearing holder 6.

Next, the ball 13 and the bearing main body 14 are mounted on the through hole 61 of the bearing holder 6 and the bearing 11 is disposed within the through hole 61. This state is shown in FIG. 2(d) and FIG. 6(a).

Next, as shown in FIG. 3 and FIGS. 6(a) through 6(c), the urging member 7 is made to slide in the direction crossing the axial line direction of the motor, in this embodiment, from the upper side in the vertical direction which is perpendicular to the axial line direction of the motor, and a pair of the hook parts 73 are entered into a pair of the respective engaging grooves 95 from the open end side. In this embodiment, the corner part 73b of the hook part 73 on the front end side in the slide direction "s" is formed in an "R"-shape or a round shape and thus the hook part 73 enters into the inside of the engaging groove 95 without being caught by the bearing holder 6.

The urging member 7 is made to slide until the stopper part 79 is abutted with the upper end part 6a of the bearing holder 6 and the front end parts of the hook parts 73 are abutted with the end parts 65b of the stepped parts 65 (front ends of the engaging grooves 95). As a result, the protruded parts 74 of the hook parts 73 are fitted to the recessed parts 65a of the stepped parts 65 (recessed parts of the engaging grooves 95). In this case, the protruded part 74 of the hook part 73 and the recessed part 65a of the stepped part 65 (recessed part of the engaging groove 95) are formed in the roughly triangular shape as described above and thus the protruded part 74 of the hook part 73 is smoothly fitted to the recessed part 65a of the stepped part 65 (recessed part of the engaging groove 95).

In this state, the bottom face part 71 of the urging member 7 is superposed on the outer end face 62 of the bearing holder 6 and the spring part 75 urges the bearing 11 to the rotor shaft 41. This urging state is maintained because, when the urging member 7 is made to slide, the hook part 73 is elastically deformed and the bearing holder 6 is elastically sandwiched between the bottom face part 71 and the hook part 73. Further, the side plate parts 72 are also elastically deformed and thus their shape returning forces also act as a force for maintaining the state where the urging member 7 is held by the bearing holder 6. In addition, in the state where the protruded parts 74 of the hook parts 73 are fitted to the recessed parts 65a of the stepped parts 65 (recessed parts of the engaging grooves 95), the stopper part 79 is abutted with the upper end part 6a of the bearing holder 6 to be elastically deformed. Therefore, the stopper part 79 acts to make the urging member 7 slide in a direction reverse to the fitting direction but this movement is prevented by engagements of the protruded parts 74 of the hook parts 73 formed in the roughly triangular shape with the recessed parts 65a of the stepped parts 65 (recessed parts of the engaging grooves 95).

The urging member 7 is mounted on the base end side of the fixed body 10 through the above-mentioned steps as shown in FIG. 1 and FIG. 2(a).

As described above, in the motor 1 in this embodiment, when the urging member 7 is to be mounted on the fixed body 10, the urging member 7 is slid in a direction crossing the axial line direction of the motor so that the bottom face part 71 of the urging member 7 is superposed on the end face 10a on the base end side of the fixed body 10 and a pair of the hook parts 73 is entered into a pair of the engaging grooves 95 from the open end side and engaged with the engaging grooves 95. Therefore, different from a conventional case that the urging member 7 is pressed in the axial line direction of the motor to be engaged with the fixed body 10, the urging member 7 can be firmly held even when a large space for engaging the urging member 7 is not secured because of downsizing of the motor 1 or, like this embodiment, even when the bearing holder 6 is too thin to secure a portion for engaging with the urging member 7. Accordingly, even when an outward force in the axial line direction of the motor is applied to the urging member 7 for causing the urging member 7 to be separated from the fixed body 10 in the state where the urging member 7 is mounted on the fixed body 10, positional displacement, falling-off or the like of the urging member 7 does not occur.

Further, the engaging groove 95, i.e., the recessed part whose width is narrow is utilized for engaging with the hook part 73. Therefore, in the state where the urging member 7 is mounted on the fixed body 10, even when an outward force in the axial line direction of the motor is applied to the urging member 7 for causing the side plate parts 72 to be widened and the hook parts 73 to be disengaged from the engaging grooves 95 of the fixed body 10 through the side plate parts 72, the hook parts 73 are abutted with the inner wall located on the tip end side in the axial line direction of the motor in the engaging grooves 95 because the width of the engaging groove 95 is set to be narrow or a little larger than the plate thickness of the hook part 73 and the engaging groove 95 is formed to be the recessed part with a narrow width. Accordingly, the tip ends of the hook parts 73 are prevented from being bent in the axial line direction of the motor. As a result, the hook parts 73 are not disengaged from the engaging grooves 95.

Further, the side plate parts 72 and the hook parts 73 are formed to be bent in the urging member 7. In this case, the side plate part 72 and the hook part 73 are bent to a slightly larger angle than the perpendicularity and thus, in the state where the urging member 7 is mounted on the fixed body 10, the side plate parts 72 and the hook parts 73 are elastically deformed largely to provide a large elastic return force. Therefore, the urging member 7 is firmly held by the fixed body 10 and thus positional displacement or falling-off of the urging member 7 does not occur.

In addition, in the state where the protruded parts 74 of the hook parts 73 are fitted to the recessed parts 65a of the stepped parts 65 (recessed parts of the engaging grooves 95), the stopper part 79 is abutted with the upper end part 6a of the bearing holder 6 to be elastically deformed. Therefore, the stopper part 79 acts to cause the urging member 7 to slide in a direction reverse to the fitting direction but this movement is prevented by engagements of the protruded parts 74 of the hook parts 73 with the recessed parts 65a of the stepped parts 65 (recessed parts of the engaging grooves 95). As a result, the position in the slide direction of the urging member 7 is not shifted.

In addition, the spring part 75 of the urging member 7 is cut in a tongue piece shape from the bottom face part 71 and obliquely bent. When the urging member 7 is to be mounted on the fixed body 10, the urging member 7 is made to slide in the state that the root portion 75b of the spring part 75 is located on its front side. Therefore, the spring part 75 is not caught by the bearing holder 6 to be prevented from being plastically deformed. Further, the end face 10a on the base end side of the fixed body 10 (outer end face 62 of the bearing holder 6) is formed with a shallow recessed part 66 over a region including the moving trajectory of the spring part 75 when the urging member 7 is slid. Therefore, when the urging member 7 is slid, the spring part 75 is securely prevented from being strongly abutted with the fixed body 10 (bearing holder 6) and from being deformed plastically.

Figure 7A:
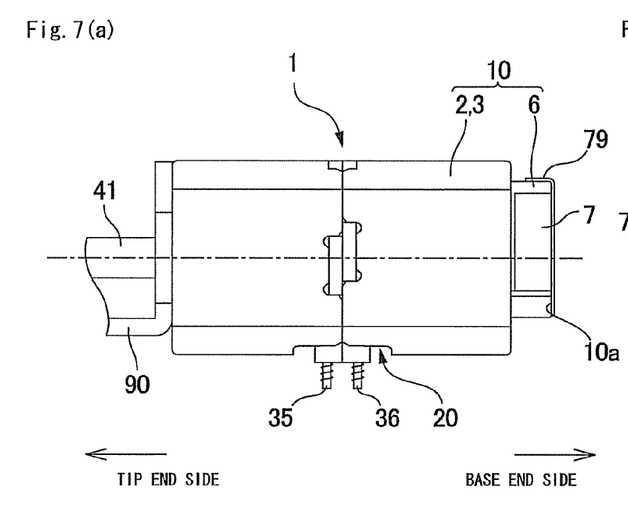
FIG. 7(a) is a front view showing a motor in accordance with another embodiment of the present invention and FIG. 7(b) is its right side view.
Figure 7B:
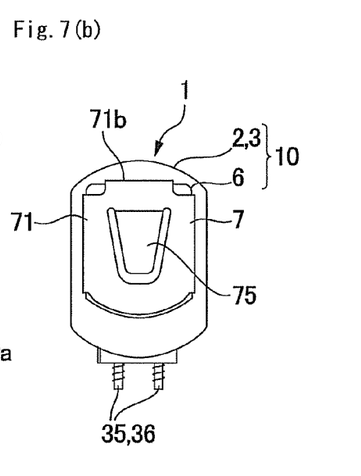
Figure 8A:
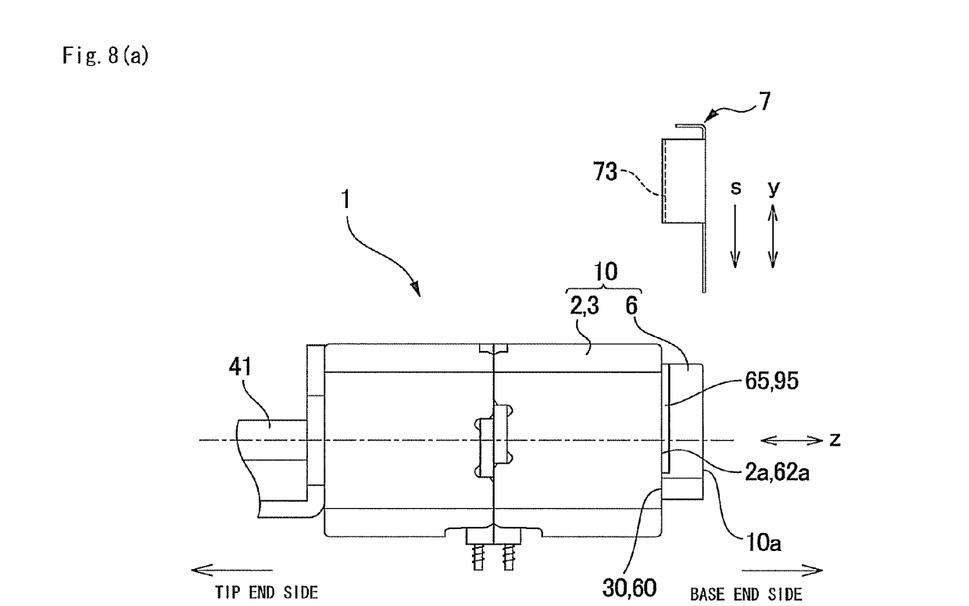
FIG. 8(a) is an explanatory view showing a state where a bearing holder is fixed to a stator in manufacturing steps for a motor in accordance with another embodiment of the present invention.
Figure 8B:
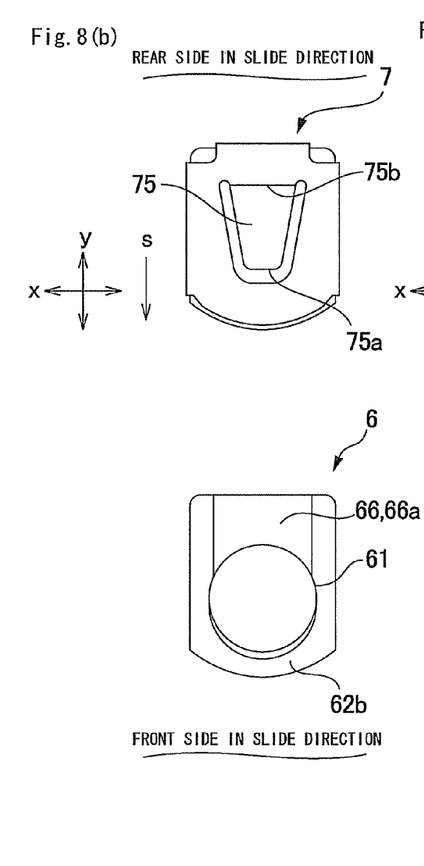
FIG. 8(b) is an explanatory view showing a positional relationship between the bearing holder and an urging member when viewed from the urging member side.
Figure 8C:
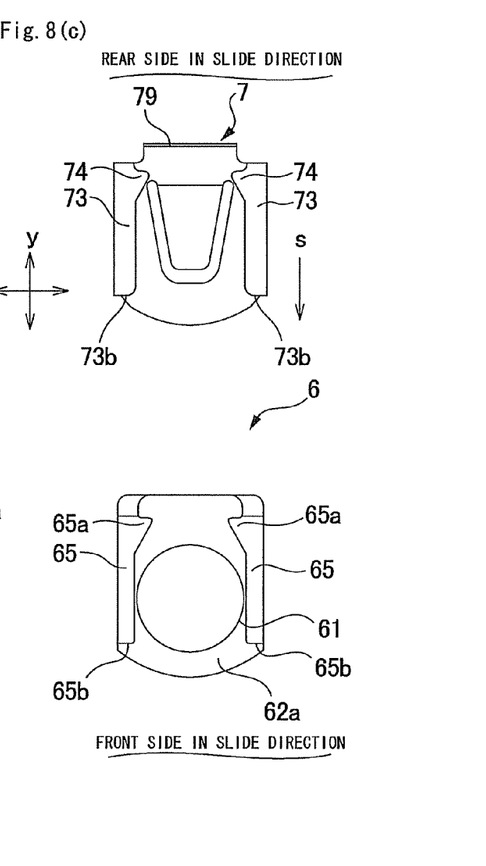
FIG. 8(c) is an explanatory view showing a positional relationship between the bearing holder and the urging member when viewed from the bearing holder side.

FIG. 7(a) is a front view showing a motor in accordance with another embodiment of the present invention and FIG. 7(b) is its right side view. FIG. 8(a) is an explanatory view showing a state where a bearing holder has been fixed to a stator in manufacturing steps for a motor in accordance with another embodiment of the present invention, FIG. 8(b) is an explanatory view showing a positional relationship between the bearing holder and an urging member when viewed from the urging member side, and FIG. 8(c) is an explanatory view showing a positional relationship between the bearing holder and the urging member when viewed from the bearing holder side. In this embodiment, a basic structure of a motor shown in FIGS. 7(a) and 7(b) and FIGS. 8(a) through 8(c) is the same as that of the motor described with reference to FIG. 1 through FIG. 6(c). Therefore, the common portions are shown with the same notational symbol and their descriptions are omitted.

In the embodiment described with reference to FIG. 1 through FIG. 6(c), the spring part 75 is cut from the bottom face part and obliquely bent such that the tip end part 75a is located on the rear side in the slide direction "s" and the root portion 75b of the spring part 75 is located on the front side in the slide direction "s" when the urging member 7 is made to slide. However, as shown in FIGS. 7(a) and 7(b) and FIGS. 8(a) through 8(c), it may be structured that the spring part 75 is cut from the bottom face part and obliquely bent such that the tip end part 75a is located on the front side in the slide direction "s" and the root portion 75b of the spring part 75 is located on the rear side in the slide direction "s" when the urging member 7 is made to slide. Also in this case, when the end face 10a on the base end side of the fixed body 10 (outer end face 62 of the bearing holder 6) is formed with a shallow recessed part 66 over a region including the moving trajectory of the spring part 75 when the urging member 7 is made to slide, the spring part 75 is securely prevented from being strongly abutted with the fixed body 10 (bearing holder 6) and being deformed plastically at the time when the urging member 7 is made to slide. Further, according to this embodiment, even when the size of the urging member 7 is reduced with downsizing of the bearing holder 6, a strength of the root portion 75b in the spring part 75 can be maintained appropriately. Accordingly, a distance between the tip end part and the root portion 75b of the urging member 7 can be secured and thus plastic deformation of the spring part 75 when the spring part 75 is cut and bent from the urging member 7 can be prevented.

In the embodiment described above, the bearing holder 6 is made of SUS but may be made of resin. Further, in the embodiment described above, the bearing holder 6 is fixed to the stator 3 (case 2) by using spot welding, but laser welding or an adhesive may be used. Further, both welding and an adhesive may be used together.

In the embodiment described above, the urging member 7 is slid to the bearing holder 6 from an upper side in the vertical direction perpendicular to the axial line direction of the motor so that a pair of the hook parts 73 are inserted into a pair of the respective engaging grooves 95 from the open end sides. However, in accordance with a structure of the bearing 11, the bearing holder 6 may be integrally formed with the stator 3 as the fixed body 10 and the bearing holder 6 is formed with a pair of the engaging grooves 95. Alternatively, the present invention may be applied to a case in which the bearing is fixed to the stator 3 and the spring part 75 of the urging member 7 presses the rotor shaft 41 directly.

Further, in the embodiment described above, the urging member 7 is held by the bearing holder 6 as the fixed body 10. However, the urging member 7 may be held by the engaging grooves which are formed in the stator 3 as the fixed body 10. Further, in the embodiment described above, a pair of the engaging grooves 95 is formed between the end face 30 on the base end side of the stator 3 and the inner end face 60 of the bearing holder 6. However, grooves corresponding to a pair of the engaging grooves 95 may be formed in the bearing holder 6.

In addition, in the embodiment described above, in order to prevent the spring part 75 of the urging member 7 from being plastically deformed due to strongly abutting with the fixed body 10 (bearing holder 6) when the urging member 7 is made to slide, the recessed part 66 is formed on the end face 10a on the base end side of the fixed body 10 (outer end face 62 of the bearing holder 6) in a region including the moving trajectory of the spring part 75 when the urging member 7 is made to slide. In this case, when the bottom face part 66a of the recessed part 66 is formed in a tapered face having a downward gradient to the rear end side in the slide direction "s", the spring part 75 can be further prevented from strongly abutting with the fixed body 10 (bearing holder 6).

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a rotor including a permanent magnet which is fixed to an outer periphery of a rotor shaft;
   a fixed body including a ring-shaped stator which faces an outer peripheral face of the permanent magnet through a gap space;
   a bearing which supports a shaft end on a base end side of the rotor shaft;
   an urging member which is mounted on the fixed body on a base end side in an axial line direction of the motor for urging the bearing to a tip end side in the axial line direction of the motor;

a pair of engaging grooves which are formed on both side face parts opposite to each other of the fixed body so as to extend in a direction crossing the axial line direction of the motor at positions apart from an end face on a base end side of the fixed body with a predetermined distance in the axial line direction of the motor, and whose open ends are directed in a same direction;

wherein the urging member comprises:
 a bottom face part provided with a spring part for urging the bearing;
 a pair of side plate parts which are bent from respective opposite edge parts of the bottom face part; and
 a pair of hook parts which are bent from respective tip ends of a pair of the side plate parts;

wherein, when the urging member is to be mounted on the fixed body, the urging member is slid in the direction crossing the axial line direction of the motor so that the bottom face part of the urging member is superposed on the end face on the base end side of the fixed body and a pair of the hook parts are inserted from the open ends into a pair of the engaging grooves to be engaged with a pair of the engaging grooves, and wherein, when an outward force in the axial line direction of the motor which is to cause the urging member to be separated from the fixed body is applied to the urging member in a state that the urging member has been mounted on the fixed body, the hook parts abut with an inner wall of the engaging grooves which is located on the tip end side in the axial line direction of the motor to prevent the hook parts from being disengaged from the engaging grooves, a protruded part for coming-off prevention of the urging member which is continuously formed in one of the hook part and the engaging groove; and a recessed part which is continuously formed in the other of the hook part and the engaging groove so as to be fitted to the protruded part for locking the protruded part.

2. The motor according to claim 1, wherein the protruded part for coming-off prevention is continuously formed in the hook part, and the recessed part which locks the protruded part is continuously formed in the engaging groove.

3. The motor according to claim 1, wherein each of a pair of the side plate parts is bent to an inner side from the bottom face part to be set at an acute angle between the side plate part and the bottom face part so that the fixed body is elastically held by a pair of the side plate parts.

4. The motor according to claim 1, wherein the spring part is cut and bent obliquely from the bottom face part so that a tip end is directed to a rear side in a slide direction and a root portion of the spring part is located on a front side in the slide direction.

5. The motor according to claim 1, wherein the spring part is cut and bent obliquely from the bottom face part so that a tip end is directed to a front side in a slide direction and a root portion of the spring part is located on a rear side in the slide direction.

6. The motor according to claim 1, wherein
the spring part is cut and bent in a tongue piece shape from the bottom face part, and the end face on the base end side of the fixed body is formed with a recessed part over a region including a moving trajectory of the spring part when the urging member is made to slide.

7. A motor comprising:
a rotor including a permanent magnet which is fixed to an outer periphery of a rotor shaft;
a fixed body including a ring-shaped stator which faces an outer peripheral face of the permanent magnet through a gap space;
a bearing which supports a shaft end on a base end side of the rotor shaft;
an urging member which is mounted on the fixed body on a base end side in an axial line direction of the motor for urging the bearing to a tip end side in the axial line direction of the motor;
a pair of engaging grooves which are formed on both side face parts opposite to each other of the fixed body so as to extend in a direction crossing the axial line direction of the motor at positions apart from an end face on a base end side of the fixed body with a predetermined distance in the axial line direction of the motor, and whose open ends are directed in a same direction;
a bearing holder for structuring the fixed body which is adjacently disposed on a base end side of the stator in the axial line direction of the motor, wherein the urging member comprises:
 a bottom face part provided with a spring part for urging the bearing;
 a pair of side plate parts which are bent from respective opposite edge parts of the bottom face part; and
 a pair of hook parts which are bent from respective tip ends of a pair of the side plate parts;

wherein, when the urging member is to be mounted on the fixed body, the urging member is slid in the direction crossing the axial line direction of the motor so that the bottom face part of the urging member is superposed on the end face on the base end side of the fixed body and a pair of the hook parts are inserted from the open ends into a pair of the engaging grooves to be engaged with a pair of the engaging grooves, wherein, when an outward force in the axial line direction of the motor which is to cause the urging member to be separated from the fixed body is applied to the urging member in a state that the urging member has been mounted on the fixed body, the hook parts abut with an inner wall of the engaging grooves which is located on the tip end side in the axial line direction of the motor to prevent the hook parts from being disengaged from the engaging grooves, wherein the bearing holder is formed with a through hole into which the bearing is movably inserted in the axial line direction of the motor, and wherein the pair of the engaging grooves are formed with an end face on the base end side of the stator and a pair of stepped parts which are formed on an inner end face of the bearing holder that is superposed on the end face on the base end side of the stator, a protruded part for coming-off prevention of the urging member which is continuously formed in one of the hook part and the engaging groove; and a recessed part which is continuously formed in the other of the hook part and the engaging groove so as to be fitted to the protruded part for locking the protruded part.

8. The motor according to claim 7, wherein the protruded part for coming-off prevention is continuously formed in the hook part, and the recessed part which locks the protruded part is continuously formed in the engaging groove.

9. The motor according to claim 8, wherein the hook part is bent to an inner side from the side plate part to be set at an acute angle between the hook part and the side plate part so that the fixed body is elastically held between the bottom face part and the hook part.

10. The motor according to claim 8, wherein each of a pair of the side plate parts is bent to an inner side from the bottom face part to be set at an acute angle between the side plate part and the bottom face part so that the fixed body is elastically held by a pair of the side plate parts.

11. The motor according to claim 8, wherein the urging member is formed with a stopper part for abutting with the fixed body which is bent from the bottom face part on a rear end side in a slide direction.

12. The motor according to claim 8, wherein
the protruded part for coming-off prevention is formed at a rear position in a slide direction of the hook part, and
the recessed part is formed in the stepped part on the inner end face of the bearing holder at the rear position in the slide direction so that the protruded part formed in the hook part is fitted into the recessed part.

13. The motor according to claim 8, wherein a corner part on a front edge of the hook part in the slide direction is formed in a round shape.

14. A motor comprising:
a rotor including a permanent magnet which is fixed to an outer periphery of a rotor shaft;
a fixed body including a ring-shaped stator which faces an outer peripheral face of the permanent magnet through a gap space;
a bearing which supports a shaft end on a base end side of the rotor shaft;
an urging member which is mounted on the fixed body on a base end side in an axial line direction of the motor for urging the bearing to a tip end side in the axial line direction of the motor; and
pair of engaging grooves which are formed on both side face parts opposite to each other of the fixed body so as to extend in a direction crossing the axial line direction of the motor at positions apart from an end face on a base end side of the fixed body with a predetermined distance in the axial line direction of the motor, and whose open ends are directed in a same direction;
wherein the urging member comprises:
a bottom face part provided with a spring part for urging the bearing;
a pair of side plate parts which are bent from respective opposite edge parts of the bottom face part; and
a pair of hook parts which are bent from respective tip ends of a pair of the side plate parts;
wherein, when the urging member is to be mounted on the fixed body, the urging member is slid in the direction crossing the axial line direction of the motor so that the bottom face part of the urging member is superposed on the end face on the base end side of the fixed body and a pair of the hook parts are inserted from the open ends into a pair of the engaging grooves to be engaged with a pair of the engaging grooves,
wherein, when an outward force in the axial line direction of the motor which is to cause the urging member to be separated from the fixed body is applied to the urging member in a state that the urging member has been mounted on the fixed body, the hook parts abut with an inner wall of the engaging grooves which is located on the tip end side in the axial line direction of the motor to prevent the hook parts from being disengaged from the engaging grooves, and
wherein the urging member is formed with a stopper part for abutting with the fixed body which is bent from the bottom face part on a rear end side in a slide direction.

15. A motor comprising:
a rotor including a permanent magnet which is fixed to an outer periphery of a rotor shaft;
a fixed body including a ring-shaped stator which faces an outer peripheral face of the permanent magnet through a gap space;
a bearing which supports a shaft end on a base end side of the rotor shaft;
an urging member which is mounted on the fixed body on a base end side in an axial line direction of the motor for urging the bearing to a tip end side in the axial line direction of the motor; and
a pair of engaging grooves which are formed on both side face parts opposite to each other of the fixed body so as to extend in a direction crossing the axial line direction of the motor at positions apart from an end face on a base end side of the fixed body with a predetermined distance in the axial line direction of the motor, and whose open ends are directed in a same direction;
wherein the urging member comprises:
a bottom face part provided with a spring part for urging the bearing;
a pair of side plate parts which are bent from respective opposite edge parts of the bottom face part; and
a pair of hook parts which are bent from respective tip ends of a pair of the side plate parts;
wherein, when the urging member is to be mounted on the fixed body, the urging member is slid in the direction crossing the axial line direction of the motor so that the bottom face part of the urging member is superposed on the end face on the base end side of the fixed body and a pair of the hook parts are inserted from the open ends into a pair of the engaging grooves to be engaged with a pair of the engaging grooves,
wherein, when an outward force in the axial line direction of the motor which is to cause the urging member to be separated from the fixed body is applied to the urging member in a state that the urging member has been mounted on the fixed body, the hook parts abut with an inner wall of the engaging grooves which is located on the tip end side in the axial line direction of the motor to prevent the hook parts from being disengaged from the engaging grooves, and
wherein the hook part is bent to an inner side from the side plate part to be set at an acute angle between the hook part and the side plate part so that the fixed body is elastically held between the bottom face part and the hook part.

* * * * *